(12) United States Patent
Nam et al.

(10) Patent No.: US 10,048,417 B2
(45) Date of Patent: *Aug. 14, 2018

(54) THIN POLARIZING PLATE AND METHOD OF MANUFACTURING THE SAME

(71) Applicant: LG Chem, Ltd., Seoul (KR)

(72) Inventors: Sung-Hyun Nam, Daejeon (KR); Kyun-Il Rah, Daejeon (KR); Jong-Hyun Jung, Daejeon (KR); Hye-Min Yu, Daejeon (KR)

(73) Assignee: LG CHEM, LTD., Seoul (KR)

( * ) Notice: Subject to any disclaimer, the term of this patent is extended or adjusted under 35 U.S.C. 154(b) by 75 days.

This patent is subject to a terminal disclaimer.

(21) Appl. No.: 14/385,727

(22) PCT Filed: Jun. 13, 2014

(86) PCT No.: PCT/KR2014/005188
§ 371 (c)(1),
(2) Date: Sep. 16, 2014

(87) PCT Pub. No.: WO2014/204134
PCT Pub. Date: Dec. 24, 2014

(65) Prior Publication Data
US 2016/0018577 A1    Jan. 21, 2016

(30) Foreign Application Priority Data

Jun. 18, 2013 (KR) .................. 10-2013-0069635
Jun. 3, 2014 (KR) .................. 10-2014-0067820

(51) Int. Cl.
G02B 5/30    (2006.01)
B32B 7/12    (2006.01)
(Continued)

(52) U.S. Cl.
CPC ............. *G02B 5/305* (2013.01); *B32B 7/12* (2013.01); *B32B 27/08* (2013.01); *B32B 27/306* (2013.01);
(Continued)

(58) Field of Classification Search
CPC ... Y10S 359/90; G02B 5/3033; G02B 27/283; G02B 5/32; G02B 5/3083; G02B 5/3025;
(Continued)

(56) References Cited

U.S. PATENT DOCUMENTS 4,350,788 A * 9/1982 Shimokawa ............ C08L 31/04
524/309
6,404,469 B1 * 6/2002 Kitagawa .......... G02F 1/133528
349/96
(Continued)

FOREIGN PATENT DOCUMENTS

CN    102325852 A    1/2012
CN    102326105 A    1/2012
(Continued)

OTHER PUBLICATIONS

KR 20130009394 A, Optical film laminate roll and method for manufacturing the same, Optical Choi Ji Yeon.*
(Continued)

*Primary Examiner* — Cara Rakowski
*Assistant Examiner* — Alberto Betancourt
(74) *Attorney, Agent, or Firm* — Dentons US LLP

(57) ABSTRACT

There is provided a method of manufacturing a thin polarizing plate including: forming a film laminate by attaching a non-stretched polyvinyl alcohol (PVA)-based film to a non-stretched base film, using attractive force therebetween or using an adhesive; stretching the film laminate; attaching a first protective film to the PVA-based film of the stretched
(Continued)

film laminate; and separating the PVA-based film having the first protective film attached thereto from the base film.

11 Claims, 3 Drawing Sheets

(51) Int. Cl.
    *B32B 27/08*       (2006.01)
    *B32B 27/30*       (2006.01)
    *B32B 27/40*       (2006.01)
    *B32B 27/36*       (2006.01)
    *B32B 27/32*       (2006.01)
    *B32B 37/00*       (2006.01)
    *B32B 37/18*       (2006.01)
    *B32B 38/10*       (2006.01)
    *B32B 38/00*       (2006.01)
    *G02B 1/14*        (2015.01)
    *B32B 37/12*       (2006.01)

(52) U.S. Cl.
    CPC ............ *B32B 27/308* (2013.01); *B32B 27/32* (2013.01); *B32B 27/36* (2013.01); *B32B 27/40* (2013.01); *B32B 37/025* (2013.01); *B32B 37/18* (2013.01); *B32B 37/187* (2013.01); *B32B 38/0012* (2013.01); *B32B 38/10* (2013.01); *G02B 1/14* (2015.01); *B32B 2037/0092* (2013.01); *B32B 2037/1253* (2013.01); *B32B 2038/0028* (2013.01); *B32B 2307/42* (2013.01); *B32B 2309/02* (2013.01); *B32B 2309/105* (2013.01); *B32B 2310/0831* (2013.01); *B32B 2331/04* (2013.01); *B32B 2551/00* (2013.01)

(58) Field of Classification Search
    CPC ........ G02B 5/30; G02B 6/2773; G02B 5/305; G02B 1/14; G02B 1/08; G02B 27/288; G02B 5/3041; G02B 2307/42; G02B 2038/0028; G02B 2329/00; B32B 38/0012; B32B 2038/0028; B32B 38/0032; B32B 2331/04; B32B 27/308; B32B 27/40; B32B 27/36; B32B 27/32; B32B 7/12; B32B 27/08; B32B 37/187; B32B 38/10; B32B 27/306; B32B 37/18; B32B 37/025; B32B 2037/1253; G02F 1/133528; G02F 2202/28; G02F 2201/50; G02F 1/133536; B29K 2029/04; B29K 2995/0034; C08J 5/18

USPC .................. 359/487.01–487.06, 900; 349/96
    See application file for complete search history.

(56) References Cited

U.S. PATENT DOCUMENTS

| | | | |
|---|---|---|---|
| 2003/0001988 A1* | 1/2003 | Maeda ................. | G02B 5/3033 349/96 |
| 2004/0170826 A1* | 9/2004 | Shibano ................ | C09J 7/0207 428/345 |
| 2007/0286998 A1* | 12/2007 | Hashimoto ............ | B32B 23/00 428/220 |
| 2008/0278810 A1 | 11/2008 | Kim et al. | |
| 2009/0163686 A1* | 6/2009 | Gerlach ................ | B29C 55/026 526/348.1 |
| 2010/0039590 A1* | 2/2010 | Miyatake .............. | C09J 129/04 359/489.07 |
| 2010/0202051 A1 | 8/2010 | Yoshimi et al. | |
| 2010/0232018 A1* | 9/2010 | Kobayashi ............ | B32B 7/12 359/488.01 |
| 2011/0300387 A1 | 12/2011 | Park et al. | |
| 2011/0315306 A1 | 12/2011 | Goto et al. | |
| 2012/0327512 A1* | 12/2012 | Goto .................... | G02B 5/3033 359/487.02 |
| 2013/0135725 A1* | 5/2013 | Mori .................... | B29C 55/026 359/487.02 |

FOREIGN PATENT DOCUMENTS

| | | | |
|---|---|---|---|
| JP | 2000-338329 A | | 12/2000 |
| JP | 2008536160 A | | 9/2008 |
| JP | 4279944 B2 | | 3/2009 |
| JP | 2012118521 A | | 6/2012 |
| JP | 2012-145766 A | | 8/2012 |
| JP | 2013218106 A | * | 10/2013 |
| JP | 2012078780 A | | 4/2014 |
| KR | 1020070078734 A | | 8/2007 |
| KR | 10-2010-0071998 A | | 6/2010 |
| KR | 10-2011-0118825 A | | 11/2011 |
| KR | 20130009394 A | * | 1/2013 ................ C09J 7/02 |
| KR | 1020130009394 A | | 1/2013 |
| KR | 1020140063442 A | | 5/2014 |
| KR | 1020140063451 A | | 5/2014 |

OTHER PUBLICATIONS

JP 2013218106 A, Polarizer, method for producing the same, polarizing plate, optical film and image display device, Ogomi, Daisuke.*

Office Action of Korean Patent Office in Appl'n No. 10-2014-0067820, dated Jul. 6, 2015.

* cited by examiner

【Figure 1】
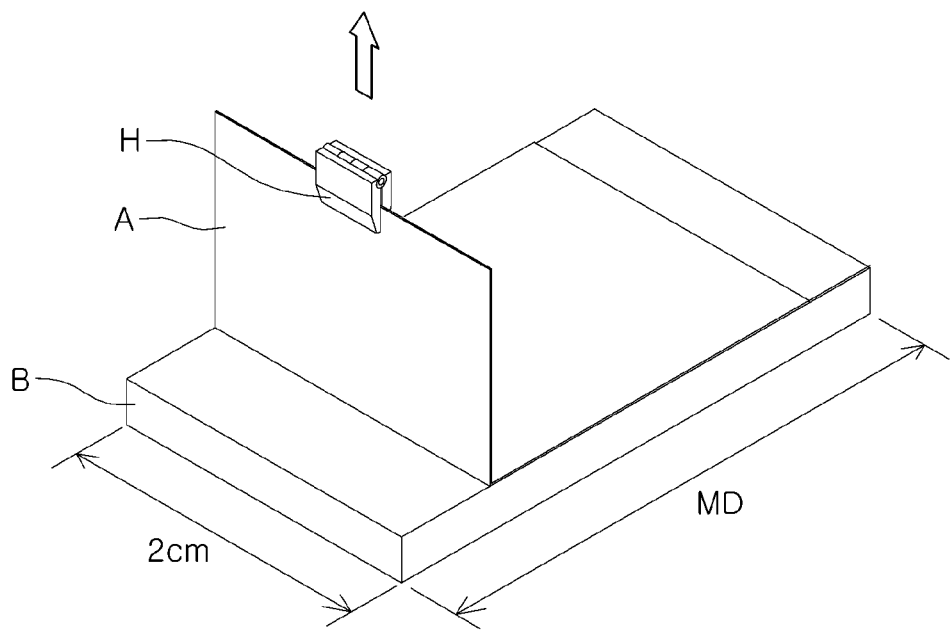
【Figure 2】
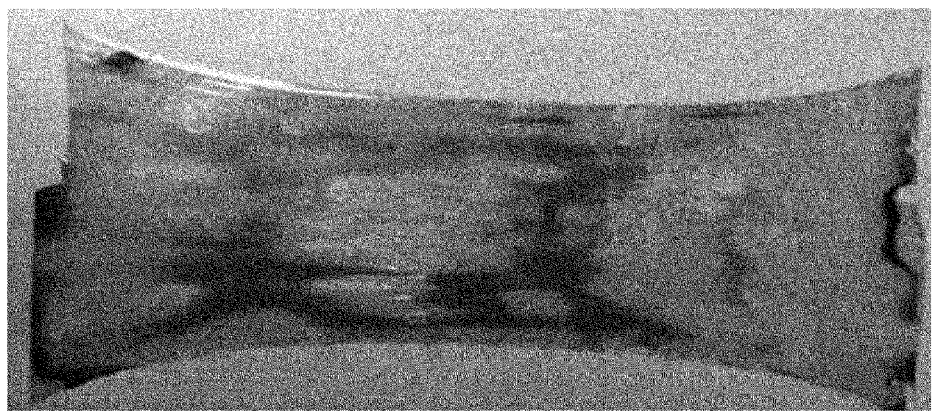

[Figure 3]
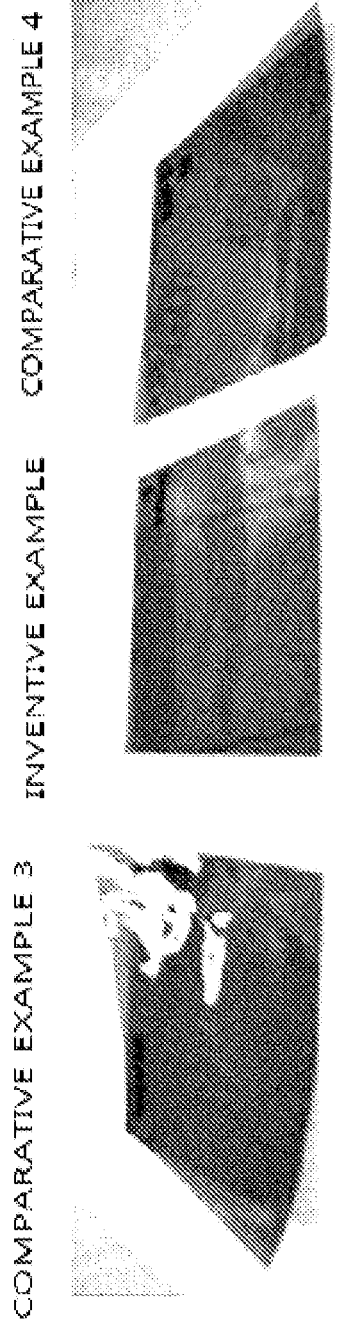

【Figure 4】
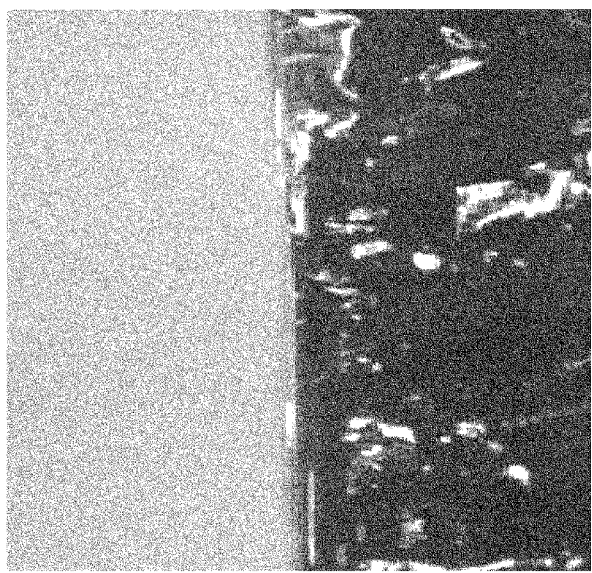
【Figure 5】
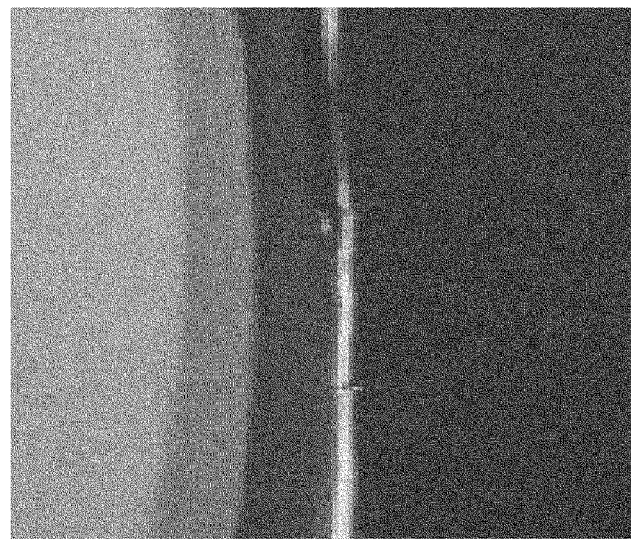

THIN POLARIZING PLATE AND METHOD OF MANUFACTURING THE SAME

This application is a National Stage application of PCT/KR2014/005188, filed on Jun. 13, 2014, which claims priority to Korean Patent Application Nos. 10-2013-0069635, filed on Jun. 18, 2013, and 10-2014-0067820 filed on Jun. 3, 2014, all of which are hereby incorporated by reference in their entirety.

TECHNICAL FIELD

The present disclosure relates to a thin polarizing plate and a method of manufacturing the same, and more particularly, to a thin polarizing plate including a polarizer having a thickness of 10 μm or less and a method of manufacturing the same allowing for various types of polarizing plate to be manufactured in a single process.

BACKGROUND ART

A polarizer used in a polarizing plate is an optical device for converting natural light or randomly polarized light into light polarized in a certain direction, and it has been widely used in display devices such as liquid crystal displays (LCDs) and organic light emitting diodes (OLEDs). As a polarizer commonly used in such display devices, a polyvinyl alcohol (PVA)-based polarizing film containing an iodine compound or a dichroic dye and having molecular chains oriented in a predetermined direction has generally been used.

The PVA-based polarizing film may be manufactured by dyeing a PVA-based film with iodine or a dichroic dye and stretching and crosslinking the film in a predetermined direction. In this case, the stretching process may be performed through wet stretching in a solution such as an aqueous boric acid solution or an aqueous iodine solution, dry stretching in the atmosphere, or the like. In the aforementioned manufacturing process according to the related art, the PVA-based film needs to have a thickness exceeding 60 μm, prior to the stretching thereof, in order to perform stretching thereon without the occurrence of breakage. In a case in which the thickness of the PVA-based film is equal to or less than 60 μm prior to the stretching process, the degree of swelling in the PVA-based film may be increased, and a modulus of such a thin film per unit area may be increased during the stretching process, whereby breakage of the film may easily occur.

Meanwhile, in accordance with the recent trend for the thinning of display devices, polarizing plates also need to have a reduced thickness. However, in the case in which a PVA-based film having a thickness exceeding 60 μm is used according to the related art, there has been a limitation on reducing the thickness of a polarizer. Therefore, research into manufacturing a polarizer having a reduced thickness has been carried out.

Korean Patent Laid-Open Publication No. 2010-0071998 discloses a method for manufacturing a thin polarizing plate using a laminate fabricated by coating a base layer with a hydrophilic polymer layer, or co-extruding a base layer-forming material and a hydrophilic polymer layer-forming material. However, in the case of using the coating or co-extruding method, the PVA layer and the base layer may not easily be separated from each other after stretching. Since a high degree of peel strength is required for the separation therebetween, defects such as damage to or a deformation of the PVA layer may occur during the separation process, resulting in a deterioration of optical properties of the PVA-based film, such as the degree of polarization and the like. In addition, in the case of using the coating or co-extruding method, since the PVA-based film is manufactured by melting a PVA resin and then co-extruding the PVA layer and the base layer, or by preparing the PVA resin as a coating solution and then applying the coating solution to the base layer, the physical properties of the manufactured PVA film may be easily changed, depending on extruding conditions, coating conditions or film forming conditions. Thus, the physical properties of the resultant PVA film may deteriorate and uniformity thereof may not be obtained.

Therefore, a polarizing plate including a thin film polarizer having superior optical properties needs to be manufactured.

DISCLOSURE

Technical Problem

In order to solve the above problems, an aspect of the present disclosure provides a thin polarizing plate having superior optical properties, in particular, a single transmittance of 40% to 45% and a degree of polarization of 99% or higher, and exhibiting superior properties in terms of curling, and a method of manufacturing the same.

Technical Solution

According to an aspect of the present disclosure, there is provided a method of manufacturing a thin polarizing plate including: forming a film laminate by attaching a non-stretched polyvinyl alcohol (PVA)-based film to a non-stretched base film, using attractive force therebetween or using an adhesive; stretching the film laminate; attaching a first protective film to the PVA-based film of the stretched film laminate; and separating the PVA-based film having the first protective film attached thereto from the base film.

The method may further include dyeing the film laminate with at least one of iodine and a dichroic dye, prior to the stretching of the film laminate.

The method may further include drying the stretched film laminate, after the stretching of the film laminate.

The method may further include attaching a second protective film to a surface of the PVA-based film having no protective film, after the separating of the PVA-based film having the first protective film attached thereto from the base film.

The method may further include forming a sticky layer on a surface of the PVA-based film having no protective film, after the separating of the PVA-based film having the first protective film attached thereto from the base film.

According to another aspect of the present disclosure, there is provided a thin polarizing plate including: a polyvinyl alcohol (PVA)-based polarizer having a thickness of 10 μm or less; and a first protective film attached to one surface of the PVA-based polarizer, wherein the polarizing plate has a single transmittance of 40% to 45% and a degree of polarization of 99.0% or higher.

Advantageous Effects

In a method of manufacturing a thin polarizing plate according to exemplary embodiments of the present disclosure, a thin polarizing plate having superior optical properties may be manufactured. In a case in which a polyvinyl alcohol (PVA)-based film is attached to both surfaces of a base film, productivity in manufacturing the polarizing plate may be increased and various types of polarizing plate may be manufactured in a single process.

In addition, the thin polarizing plate manufactured using the method of manufacturing a thin polarizing plate according to exemplary embodiments of the present disclosure may be less curled, and thus, when such a thin polarizing plate is applied to a display device, light leakage may be minimized.

DESCRIPTION OF DRAWINGS

FIG. 1 is a view illustrating a method of measuring adhesive strength using a texture analyzer;

FIG. 2 is a photograph illustrating a state of a film laminate manufactured according to Comparative Example 1;

FIG. 3 is photographs illustrating curling properties of a thin polarizing plate manufactured according to the Inventive Example and Comparative Examples 3 and 4;

FIG. 4 is a photograph illustrating a curling phenomenon at sides of a film laminate according to Comparative Example 6 after stretching; and FIG. 5 is a photograph illustrating a state of a film laminate according to Inventive Example 2 after stretching.

BEST MODE

Hereinafter, embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

As a result of repeated research into manufacturing a polarizer having superior optical properties while being significantly thin, i.e., having a thickness of 10 μm or less, without the occurrence of breakage, the inventors found that the aforementioned objectives could be achieved by attaching a polyvinyl alcohol (PVA)-based film to a base film, using weak attractive force therebetween or using an adhesive, and then stretching the attached films, and filed Korean Patent Application Nos. 10-2012-0130576 and 10-2012-0130577 relating thereto.

Through additional research, the inventors found that in a case in which a first protective film is attached to the PVA-based film prior to a separation between the base film and the PVA-based film in the method of manufacturing a thin film polarizer set forth in the filed applications, the PVA-based film may be more cleanly separated from the base film, and thus, a thin polarizing plate exhibiting superior properties in terms of curling may be manufactured and productivity in the manufacturing thereof may be significantly improved, and invented the polarizer set forth herein based on the research results.

More specifically, a method of manufacturing a thin polarizing plate according to an exemplary embodiment of the present disclosure may include forming a film laminate by attaching a non-stretched PVA-based film to a non-stretched base film, using attractive force therebetween or using an adhesive; stretching the film laminate; attaching a first protective film to the PVA-based film of the stretched film laminate; and separating the PVA-based film having the first protective film attached thereto from the base film.

The non-stretched PVA-based film may be attached to the non-stretched base film using the attractive force therebetween or using the adhesive, thereby forming the film laminate. Here, the non-stretched PVA-based film may be attached to one surface or both surfaces of the non-stretched base film. In consideration of productivity and process stability, it may be preferable to attach the PVA-based film to both surfaces of the non-stretched base film.

Here, the non-stretched base film is provided to prevent breakage of the PVA-based film during stretching, and preferably, may be a polymer film having a maximum stretching magnification of 5 times or greater at a temperature of 20° C. to 85° C. In this case, the maximum stretching magnification indicates a stretching magnification immediately before the occurrence of breakage. Meanwhile, the stretching process may be dry stretching or wet stretching. In the case of wet stretching, the maximum stretching magnification may refer to a magnification at the time of performing stretching in an aqueous boric acid solution having a boric acid concentration of 1.0 wt % to 5 wt %.

The base film described above is not limited, but may be a high density polyethylene film, a polyurethane film, a polypropylene film, a polyolefin film, an ester-based film, a low density polyethylene film, a co-extruded film of high density polyethylene and low density polyethylene, a copolymer resin film having ethylene vinyl acetate contained in high density polyethylene, an acrylic film, a polyethylene terephthalate film, a PVA-based film, a cellulose film, or the like, by way of example.

Meanwhile, a thickness of the base film used in the exemplary embodiment of the present disclosure may be 20 μm to 100 μm, preferably 30 μm to 80 μm, more preferably 40 μm to 60 μm. In a case in which the thickness of the base film is less than 20 μm, it may be difficult to sufficiently support the PVA-based film during the stretching of the film laminate, resulting in the occurrence of breakage or the like. In a case in which the thickness of the base film exceeds 100 μm, stretching efficiency of the film laminate may be lowered and a smooth contraction in a width of the PVA-based film during drying may be disturbed, whereby optical properties of the resultant polarizer may deteriorate.

In addition, a glass transition temperature of the base film may be lower than that of the PVA-based film. For example, the glass transition temperature of the base film may be 20° C. to 60° C., preferably 30° C. to 60° C. In general, considering that a glass transition temperature of a PVA-based film is 70° C. to 80° C., the glass transition temperature of the base film is within the above range, the base film may become softer under the stretching temperature conditions, thereby allowing for the PVA-based film to be stretched properly. However, in a case in which the glass transition temperature of the base film is excessively low, breakage may occur at a relatively high stretching magnification. Therefore, the glass transition temperature of the base film may be 20° C. or higher. Meanwhile, the glass transition temperature may be measured using a differential scanning calorimeter (DSC). For example, when a sample film of approximately 10 mg is sealed in a DSC pan and heated under predetermined temperature rising conditions, amounts of heat absorption and generation resulting from phase variations of the sample film may be observed according to temperatures to thereby measure a glass transition temperature of the sample film.

In addition, a modulus of the base film may be 200 MPa to 1500 MPa at room temperature of 25° C., preferably 350 MPa to 1300 MPa. In a case in which the modulus of the base film exceeds 1500 MPa, it may be difficult to perform stretching at a relatively high magnification. In a case in which the modulus of the base film is less than 200 MPa, breakage may occur during the stretching process. Here, the modulus may be measured by fixing both ends of a sample film prepared according to standard, JIS-K6251-1 and applying force to the film in a direction perpendicular to a thickness direction of the film and measuring stress per unit area according to strain rate. As a measuring device, for example, a Zwick/Roell 2010 UTM for tensile tests or the like may be used.

In addition, force at break points of the base film may be 5N to 40N at room temperature of 25° C., preferably 10N to 30N. Here, a breaking strength may refer to a tensile strength when the base film is broken at the time of applying force in a direction perpendicular with respect to a thickness direction of the film, and may be measured by a Zwick/Roell Z010 UTM for tensile tests, for example. In a case in which the breaking strength of the base film is outside of the above range, it may be difficult to stretch the film at a relatively high magnification, or the breakage of the film may occur during the stretching process.

Next, a thickness of the non-stretched PVA-based film attached to the base film may be 10 μm to 60 μm, preferably 10 μm to 40 μm. In a case in which the thickness of the PVA-based film exceeds 60 μm, it may be difficult to allow the PVA film to have a thickness of 10 μm or less even after stretching. In a case in which the thickness of the PVA-based film is less than 10 μm, the breakage of the PVA-based film may easily occur during the stretching process.

Meanwhile, the PVA-based film may have a degree of polymerization of about 1,000 to 10,000, preferably, about 1,500 to 5,000, but is not limited thereto. In a case in which the degree of polymerization of the PVA-based film is within the above range, molecules may move freely and may be smoothly combined with iodine, a dichroic dye, or the like.

Meanwhile, the PVA-based film according to the exemplary embodiment of the present disclosure may be a commercially available PVA-based film, for example, PS30, PE30 or PE60 manufactured by Kuraray, M2000, M3000 or M6000 manufactured by Nippon Synthetic Chemical Industry Co., Ltd., or the like.

Meanwhile, in the exemplary embodiment of the present disclosure, the base film and the PVA-based film may be attached to one another using weak attractive force generated between surfaces of the base film and the non-stretched PVA-based film without a separate medium, or using an adhesive.

In the case of attaching the base film and the non-stretched PVA-based film to one another using the attractive force, a surface treatment may be performed on one surface or both surfaces of the base film or the PVA-based film to allow them to have an appropriate degree of adhesive strength. Here, the surface treatment may be performed through various surface treatment methods commonly known in the art to which the present disclosure pertains, for example, a corona treatment, a plasma treatment, or a surface modification treatment using a strongly alkaline aqueous solution such as NaOH or KOH.

Meanwhile, in the case of attaching the base film and the PVA-based film to one another using the adhesive, a thickness of the adhesive layer prior to the stretching of the film laminate may be 20 nm to 4,000 nm, preferably 20 nm to 1,000 nm, more preferably 20 nm to 500 nm. The thickness of the adhesive layer after the stretching of the film laminate may be 10 nm to 1,000 nm, preferably 10 nm to 500 nm, more preferably 10 nm to 200 nm. When the thickness of the adhesive layer is within the above range prior to and after the stretching of the film laminate, the separation of the PVA-based film after the stretching and drying processes may be facilitated without damage thereto.

Meanwhile, a material of the adhesive is not particularly limited, and various types of adhesive known in the art to which the present disclosure pertains may be used without limitation. For example, the adhesive layer may be formed of a water-based adhesive or an ultraviolet curable adhesive.

In a case in which the adhesive layer is formed of a water-based adhesive, the water-based adhesive may include a PVA-based resin containing an acetoacetyl group and an amine-based metal compound crosslinking agent. More specifically, the adhesive may be an aqueous solution including 100 parts by weight of the PVA-based resin containing the acetoacetyl group and 1 to 50 parts by weight of the amine-based metal compound crosslinking agent.

According to research results of the inventors, in a case in which a base film and a PVA-based film are attached using a general water-based adhesive, the adhesive may be dissolved by water permeation during stretching and cleaning processes due to low waterproofing properties, the attachment between the base film and the PVA-based film may be implemented in a non-uniform manner, resulting in an increase in breakage occurrence rates during the stretching process. In this case, after the base film and the PVA-based film are attached to each other, a large amount of wrinkles may be generated in the form of surface cracks due to a difference in degrees of swelling between the base film and the PVA-based film, whereby the surface state may be poor and a curling phenomenon may occur at sides of the film after stretching. This is because the existing adhesive may be exposed to water and dissolved in water, so that the attachment between the base film and the PVA-based film is implemented in a non-uniform manner. However, in the case of using the water-based adhesive including a PVA-based resin containing an acetoacetyl group and an amine-based metal compound crosslinking agent according to the exemplary embodiment of the present disclosure, crosslinking reaction may occur between the amine-based metal compound and the acetoacetyl group of the PVA-based resin at the time of curing the adhesive, thereby significantly improving waterproofing properties of the adhesive layer after curing. As a result, the aforementioned problem caused by insufficient waterproofing properties of the existing PVA-based adhesive may be addressed.

Meanwhile, degrees of polymerization and saponification of the PVA-based resin are not particularly limited as long as the PVA-based resin contains the acetoacetyl group. The PVA-based resin may have a degree of polymerization of 200 to 4,000, and may have a degree of saponification of 70 mol % to 99.9 mol %. Considering the freedom of movement of molecules for a flexible mix of the contained materials, the degree of polymerization may be 1,500 to 2,500 and the degree of saponification may be 90 mol % to 99.9 mol %. Here, the PVA-based resin may include 0.1 mol % to 30 mol % of the acetoacetyl group. Within the above range, reaction between the PVA-based resin and the amine-based metal compound crosslinking agent may be satisfactorily performed, and the adhesive may have desired waterproofing properties.

The amine-based metal compound crosslinking agent may be a water-soluble crosslinking agent containing a functional group having a predetermined reactivity to the PVA-based resin, and may be a metal complex containing an amine-based ligand. The metal complex may include a transition metal selected from zirconium (Zr), titanium (Ti), hafnium (Hf), tungsten (W), iron (Fe), cobalt (Co), Nickel (Ni), ruthenium (Ru), osmium (Os), rhodium (Rh), iridium (Ir), palladium (Pd) and platinum (Pt). The ligand coupled to the central metal may include at least one amine group such as a primary amine, a secondary amine (a diamine), a tertiary amine, or ammonium hydroxide.

In addition, the PVA-based resin containing the acetoacetyl group may have a solid content of 1 wt % to 10 wt %. In a case in which the solid content of the PVA-based resin is less than 1 wt %, the adhesive may not secure sufficient waterproofing properties, and thus, it may be less effective in lowering a breakage occurrence rate during the stretching process. In a case in which the solid content of the PVA-based resin exceeds 10 wt %, the workability of the adhesive may deteriorate, and damage to the surface of the PVA-based film at the time of being separated may occur.

Meanwhile, the pH of the adhesive may be 4.5 to 9. In a case in which the pH of the adhesive is within the above range, the adhesive may be further advantageous in terms of storage stability and durability in a highly humid atmosphere.

Meanwhile, the pH of the adhesive may be adjusted by providing an acid to an aqueous solution. Here, the pH adjusting agent may be either a strong acid or a weak acid. For example, the pH adjusting agent may be nitric acid, hydrochloric acid, sulfuric acid, acetic acid or the like.

The thickness of the adhesive layer formed of the aforementioned adhesive may be 80 nm to 200 nm, preferably nm to 150 nm, prior to the stretching of the film laminate, and may be 10 nm to 100 nm, preferably 10 nm to 80 nm after the stretching of the film laminate. In a case in which the thickness of the adhesive layer is within the above range, adhesive strength between the polyurethane film and the PVA-based film may be sustained appropriately, a breakage occurrence rate may be lowered during the stretching process, while damage to the polarizer surface at the time of being separated may be minimized.

In the case of the adhesive, a crosslinking reaction occurs between the amine-based metal compound and the acetoacetyl group of the PVA-based resin at the time of curing the adhesive, waterproofing properties of the adhesive layer after curing may be significantly improved. In a case in which the polymer film and the PVA-based film are stacked using such an adhesive, a phenomenon in which the adhesive is dissolved in water at the time of being wet-stretched may be minimized. Thus, the adhesive may be advantageously used in the wet stretching process.

Meanwhile, the adhesive layer may be formed of an ultraviolet curable adhesive. For example, the adhesive layer may be formed of an ultraviolet curable adhesive including a first epoxy compound having a glass transition temperature of a homopolymer of 120° C. or higher, a second epoxy compound having a glass transition temperature of a homopolymer of 60° C. or lower, and a cationic photopolymerization initiator. Specifically, the ultraviolet curable adhesive may include 100 parts by weight of the first epoxy compound having a glass transition temperature of a homopolymer of 120° C. or higher, 30 to 100 parts by weight of the second epoxy compound having a glass transition temperature of a homopolymer of 60° C. or lower, and 0.5 to 20 parts by weight of the cationic photopolymerization initiator.

The epoxy compound described herein may refer to a compound having one or more epoxy groups in a molecule, preferably having two or more epoxy groups in a molecule, and may be understood as including the forms of a monomer, a polymer and a resin. The epoxy compound according to the exemplary embodiment of the present disclosure may be in the form of a resin.

Meanwhile, the first epoxy compound is not particularly limited so long as it has a glass transition temperature of a homopolymer of 120° C. or higher. For example, an alicyclic epoxy compound and/or an aromatic epoxy compound having a glass transition temperature of a homopolymer of 120° C. or higher may be used as the first epoxy compound in the exemplary embodiment of the present disclosure. Examples of the epoxy compound having a glass transition temperature of a homopolymer of 120° C. or higher include, 3,4-epoxycyclohexylmethyl-3,4'-epoxycyclohexanecarboxylate, vinylcyclohexene dioxide dicyclopentadiene dioxide, bis(epoxycyclopentyl)ether, a bisphenol A-based epoxy compound, a bisphenol F-based epoxy compound, and the like. Meanwhile, the first epoxy compound may have a glass transition temperature of a homopolymer ranging from 120° C. to 200° C.

Next, the second epoxy compound is not particularly limited so long as it has a glass transition temperature of a homopolymer of 60° C. or lower. For example, an alicyclic epoxy compound, an aliphatic epoxy compound or the like may be used as the second epoxy compound in the exemplary embodiment of the present disclosure.

Here, the alicyclic epoxy compound may be a bi-functional epoxy compound, that is, a compound having two epoxy groups, wherein the two epoxy groups are both alicyclic epoxy groups. However, the alicyclic epoxy compound is not limited thereto.

The aliphatic epoxy compound may be an epoxy compound having an aliphatic epoxy group rather than the alicyclic epoxy group. For example, a polyglycidyl ether of aliphatic polyhydric alcohol; a polyglycidyl ether of alkylene oxide addition product of aliphatic polyhydric alcohol; a polyglycidyl ether of aliphatic polyhydric alcohol and polyesterpolyol of aliphatic polyhydric carboxylic acid; a polyglycidyl ether of aliphatic polyhydric carboxylic acid; a polyglycidyl ether of aliphatic polyhydric alcohol and polyester polycarboxylic acid of aliphatic polyhydric carboxylic acid; a dimer, an oligomer, or a polymer obtained through vinyl polymerization of glycidyl acrylate or glycidyl methacrylate; an oligomer or a polymer obtained through vinyl polymerization of a vinyl-based monomer different from glycidyl acrylate or glycidyl methacrylate; or the like may be used as the aliphatic epoxy compound. Preferably, a polyglycidyl ether of aliphatic polyhydric alcohol or of alkylene oxide addition product of aliphatic polyhydric alcohol may be used. However, the aliphatic epoxy compound is not limited thereto.

The aliphatic polyhydric alcohol may be aliphatic polyhydric alcohol having 2 to 20 carbon atoms, 2 to 16 carbon atoms, 2 to 12 carbon atoms, 2 to 8 carbon atoms, or 2 to 4 carbon atoms. For example, the aliphatic polyhydric alcohol may include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentylglycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol or the like; alicyclic diols such as cyclohexanedimethanol, cyclohexanediol, hydrogenated bisphenol A, hydrogenated bisphenol F; trimethylolethane, trimethylolpropane, hexitols, pentitols, glycerine, polyglycerine, pentaerythritol, dipentaerythritol, tetramethylolpropane, and the like.

In addition, the alkylene oxide may be an alkylene oxide having 1 to 20 carbon atoms, 1 to 16 carbon atoms, 1 to 12 carbon atoms, 1 to 8 carbon atoms, or 1 to 4 carbon atoms. For example, the alkylene oxide may include ethyleneoxide, propyleneoxide, butyleneoxide, and the like.

Furthermore, the aliphatic polyhydric carboxylic acid may, for example, include oxalic acid, malonic acid, succinic acid, glutaric acid, adipic acid, pimelic acid, suberic acid, azelaic acid, sebacic acid, dodecanoic acid, 2-methylsuccinic acid, 2-methyladipic acid, 3-methyladipic acid, 3-methylpentanoic acid, 2-methyloctanoic acid, 3,8-dimethyl decanoic acid, 3,7-dimethyl decanoic acid, 1,20-eicosamethylenedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 1,4-dicarboxylmethylenecyclohexane, 1,2,3-propanetricarboxylic acid, 1,2,3,4-butanetetracarboxylic acid, 1,2,3,4-cyclobutanetetracarboxylic acid, and the like, but is not limited thereto.

Preferably, the second epoxy compound in the exemplary embodiment of the present disclosure may include one or more glycidyl ether groups. For example, the second epoxy compound in the exemplary embodiment of the present disclosure may be at least one selected from the group consisting of 1,4-cyclohexanedimethanol diglycidyl ether, 1,4-butanediol diglycidyl ether, 1,6-hexanediol diglycidyl ether, neopentyl diglycidyl ether, resorcinol diglycidyl ether, diethylene glycol diglycidyl ether, ethylene glycol diglycidyl ether, trimethylolpropanetriglycidyl ether, n-butyl diglycidyl ether, 2-ethylhexyl glycidyl ether, phenyl glycidyl ether, and o-cresyl glycidyl ether.

Meanwhile, the second epoxy compound may have a glass transition temperature of a homopolymer ranging from 0° C. to 60° C.

Meanwhile, according to the exemplary embodiment of the present disclosure, a combination of the first epoxy compound containing at least one epoxidized alicyclic group and the second epoxy compound containing at least one glycidyl ether group may preferably be used as the epoxy compound, without being limited thereto.

Meanwhile, after the film laminate is formed by attaching the PVS-based film to both surfaces of the base film, the film laminate may be stretched. Here, the stretching process may be performed to allow the PVA-based film to have a thickness of 10 μm or less. For example, the PVA-based film may be stretched to have a thickness of 1 μm to 10 μm, a thickness of 3 μm to 10 μm, or a thickness of 1 μm to 5 μm.

In addition, the stretching process may be performed by allowing for a contraction rate of the PVA-based film in a width direction thereof to be 30% to 80%, preferably 60% to 80%. In a case in which the width contraction rate of the PVA-based film is within the above range, superior optical properties may be obtained.

Meanwhile, according to the exemplary embodiment of the present disclosure, the stretching conditions are not particularly limited. For example, the stretching process may be performed at a magnification of 5 to 15 times at a temperature of 20° C. to 85° C., preferably at a magnification of 5 to 12 times at a temperature of 40° C. to 80° C.

Here, the stretching process may be performed through wet stretching or dry stretching. The wet stretching process may be preferable to the dry stretching process, in that it may be stably performed without a separate medium as it allows for stronger surface adhesion strength between the base film and the PVA-based film than the dry stretching process. Meanwhile, the wet stretching process may be performed in an aqueous boric acid solution, wherein a boric acid concentration may be 1.0 wt % to 5.0 wt %.

When the stretching process is performed in the aqueous boric acid solution as described above, a breakage occurrence rate in the PVA film may be lowered due to boric acid crosslinking, such that process stability may be enhanced and the generation of wrinkles in the PVA film, easily generated during wet processing, may be controllable. In addition, the wet stretching process may be advantageously performed at a temperature lower than that of the dry stretching process.

Meanwhile, a process for manufacturing a polarizing element may generally include washing, swelling, dyeing, cleaning, stretching, complementing, and drying processes, and the like. In the exemplary embodiment of the present disclosure, the cleaning and stretching processes may be performed in the aqueous boric acid solution. More particularly, a boric acid concentration in the cleaning process may be 0.1 wt % to 2.5 wt %, preferably 0.5 wt % to 2.0 wt %, and a boric acid concentration in the stretching process may be 1.0 wt % to 5.0 wt %, preferably 1.5 wt % to 4.5 wt %.

Meanwhile, the stretching process may be performed together with at least one process of dyeing the PVE-based film with iodine and/or a dichroic dye and crosslinking the PVE-based film with the dyed iodine and/or dichroic dye.

For example, the stretching process may be performed in an aqueous solution containing iodine and/or a dichroic dye along with a boric acid, so that the dyeing, crosslinking and stretching processes may be performed simultaneously. Alternatively, after the dyeing process is performed by dipping the film laminate into an aqueous solution containing iodine and/or a dichroic dye, the crosslinking and stretching processes may be simultaneously performed by dipping the dyed film laminate into an aqueous boric acid solution and stretching the same in the aqueous boric acid solution.

Meanwhile, an adhesive strength between the stretched PVA-based film and the stretched base film after the stretching of the film laminate may be 2N/2 cm or less, preferably 0.1 to 2N/2 cm, more preferably 0.1 to 1N/2 cm. In a case in which the adhesive strength between the stretched base film and the stretched PVA-based film is within the above range, damage to the surfaces thereof may be minimized during the separation thereof. In the manufacturing method according to the exemplary embodiment of the present disclosure, in a case in which the adhesive layer is formed between the PVA-based film and the base film, the adhesive layer may be stretched along with the PVA-based film and the base film, and thus, a thickness of the adhesive layer may be reduced to 10% to 50% of the original thickness thereof before being stretched. As a result, the adhesive strength between the PVA-based film and the base film may be lowered to be 2N/2 cm or less, so that they may be separated from each other with ease. Meanwhile, the adhesive strength refers to adhesion measured in the case of attaching sample films having a length of 2 cm, and a measurement method is illustrated in FIG. 1. In the exemplary embodiment of the present disclosure, the adhesive strength between the films refers to a peel strength measured while the PVA film A of the film laminate is peeled off from the base film B by applying force in a direction perpendicular to a planar direction of the film laminate, after the PVA film A of the film laminate is fixed using a sample holder H. Here, a measuring device was a Texture Analyzer (Model name: TA-XT Plus) by Stable Micro Systems.

Meanwhile, after the stretching process, the stretched film laminate may be dried as necessary. Here, the drying process may be performed at 20° C. to 100° C., preferably 40° C. to 90° C., and a drying time may be 1 to 10 minutes. The drying process may serve to remove moisture on or within a surface of the PVA film, thereby preventing a deterioration in properties of a PVA polarizer due to moisture during the manufacturing of a polarizing plate. In addition, the drying process may serve to smoothly induce a contraction of the stretched PVA film in a width direction thereof during the drying process and to increase the orientation of a complex formed of polyvinyl alcohol and iodine, thereby improving the degree of polarization of the polarizer.

After the film laminate is stretched as described above, the first protective film may be attached to the PVA-based film of the stretched film laminate. In a case in which the PVA-based film is attached to both surfaces of the base film, the first protective film may be attached to each PVA-based film.

Here, various types of film used as polarizer protective films or retardation films, luminance improving films in the art to which the present disclosure pertains may be used as the first protective film, without limitation. For example, the first protective film may be at least one selected from the group consisting of a polyester-based polymer, a styrene-based polymer, a cellulose-based polymer, a polyethersulfone-based polymer, a polycarbonate-based polymer, an acrylic-based polymer, a polyolefin-based polymer, a polyamide-based polymer, a polyimide-based polymer, a sulfone-based polymer, a poly ether sulfone-based polymer, a polyether ether ketone-based polymer, a polyphenylene sulfide-based polymer, a vinyl alcohol-based polymer, a vinylidene chloride polymer, a vinyl butyral-based polymer, an arylate-based polymer, a polyoxymethylene-based polymer, an epoxy-based polymer, and mixtures thereof. Meanwhile, in a case in which the PVA-based film is attached to both surfaces of the base film, the first protective films to be attached to the PVA-based films may be the same as or different from each other. In a case in which different protective films as the first protective film are attached to both surfaces of the film laminate, polarizing plates having different protective films may be advantageously manufactured in a single process.

Meanwhile, the attachment of the first protective film may be performed using an adhesive. Here, the adhesive usable herein may be an adhesive, a gluing agent, or the like, for a polarizing plate, commonly known in the art to which the present disclosure pertains. Here, the adhesive or the gluing agent may be properly selected by taking account of a material of the second protective film, or the like, to be used. For example, in a case in which a cellulose-based film is used as the first protective film, a water-based adhesive such as a PVA-based adhesive may be used. In a case in which an acrylic film, a cycloolefin polymer (COP) film, or the like, is used as the first protective film, a photocurable or thermosetting adhesive such as an acrylic-based adhesive, an epoxy-based adhesive, or the like, may be used.

Then, the PVA-based film to which the first protective film has been attached may be separated from the base film. In the separation process, weak peel strength may be applied to the PVA-based film to which the first protective film has been attached or the base film to allow both of the films to be separated from each other. Here, the degree of peel strength may be 2N/2 cm or less. For example, the degree of peel strength may be 0.1 to 2N/2 cm, preferably 0.1 to 1N/2 cm. In the exemplary embodiment of the present disclosure, since the adhesive strength between the base film and the PVA-based film is weak and the adhesive strength between the first protective film and the PVA-based film is relatively higher than the adhesive strength between the base film and the PVA-based film, when weak peel strength is applied thereto, the PVA-based film may be cleanly separated from the base film. Since the degree of peel strength required for separating the PVA-based film and the base film is significantly weak, as compared to a case of stacking films using a coating or co-extruding method, the two films may be easily separated from each other without a separate process or device. Furthermore, damage to the PVA-based film may be reduced during the separation process, whereby significantly superior optical performance may be exhibited.

After the above separation process is completed, a polarizing plate in which the first protective film has been attached to one surface of the PVA-based film having a thickness of 10 μm or less may be obtained. In a case in which the PVA-based films are attached to both surfaces of the base film, two polarizing plates may be obtained through a single process.

In the case of the polarizing plate having the first protective film attached to one surface of the PVA-based film, a sticky layer may be further formed on the other surface of the PVA-based film having no first protective film attached thereto, and/or a second protective film may be further formed on the other surface of the PVA-based film having no first protective film.

Here, the forming of the sticky layer may be performed by applying an adhesive composition having at least one selected from the group consisting of an acrylic-based copolymer, an epoxy-based resin, a polyurethane-based resin, a silicon-based resin, a polyether-based resin, a polyamide-based resin, and a PVA-based resin to the other surface of the PVA-based film having no first protective film and irradiating the adhesive composition with light or heat to cure the same.

Meanwhile, the attachment of the second protective film may be performed using an adhesive. Here, the adhesive usable herein may be an adhesive, a gluing agent, or the like, for a polarizing plate, commonly known in the art to which the present disclosure pertains. Here, the adhesive or the gluing agent may be properly selected by taking account of a material of the first protective film, or the like, to be used. For example, in a case in which a cellulose-based film is used as the second protective film, a water-based adhesive such as a PVA-based adhesive may be used. In a case in which an acrylic film, a cycloolefin film, or the like, is used as the second protective film, a photocurable or thermosetting adhesive such as an acrylic-based adhesive, an epoxy-based adhesive, or the like, may be used.

Here, various types of film used as polarizer protective films or retardation films in the art to which the present disclosure pertains may be used as the second protective film, without limitation. For example, the second protective film may be at least one selected from the group consisting of a polyester-based polymer, a styrene-based polymer, a cellulose-based polymer, a polyethersulfone-based polymer, a polycarbonate-based polymer, an acrylic-based polymer, a polyolefin-based polymer, a polyamide-based polymer, a polyimide-based polymer, a sulfone-based polymer, a poly ether sulfone-based polymer, a polyether ether ketone-based polymer, a polyphenylene sulfide-based polymer, a vinyl alcohol-based polymer, a vinylidene chloride polymer, a vinyl butyral-based polymer, an arylate-based polymer, a polyoxymethylene-based polymer, an epoxy-based polymer, and mixtures thereof.

Meanwhile, in a case in which the PVA-based film is attached to both surfaces of the base film, two polarizing plates may be manufactured in a single process, resulting in superior manufacturing productivity. In a case in which different protective films as the first protective film are attached to both surfaces of the film laminate, the production of two different products may be advantageously implemented in a single process.

In addition, in the case of the polarizing plate having the first protective film attached to one surface of the PVA-based film and having the sticky layer formed on the other surface of the PVA-based film, a single-sided polarizing plate having the protective film on one surface of the PVA-based film may be manufactured. In the case in which the second protective film is further attached thereto, a double-sided polarizing plate may be manufactured. Therefore, the manufacturing method according to the exemplary embodiment of the present disclosure may allow for various types of polarizing plates to be manufactured.

Meanwhile, the method of manufacturing a thin polarizing plate according to the exemplary embodiment of the present disclosure may be performed using processes known in the art to which the present disclosure pertains, such as a sheet-to-sheet process, a sheet-to-roll process, a roll-to-roll process, or the like. Here, the sheet-to-sheet process uses sheet-fed films having a predetermined size as raw material films (that is, the PVA-based film, the base film and the protective film), while the sheet-to-roll process uses a long roll film wound on a roller as one of the raw material films and a sheet-fed film having a predetermined size as the other raw material film. In addition, the roll-to-roll process uses roll films as the raw material films. In consideration of process continuity and productivity, the roll-to-roll process may be used in particular.

For example, the method of manufacturing a thin polarizing plate according to an exemplary embodiment of the present disclosure may include forming a film laminate by attaching a base film and a PVA-based film using attractive force or an adhesive having an adhesive strength of 2N/2 cm or less, while unwinding the base film and the PVA-based film from a base film roll and a PVA-based film roll, respectively; stretching the film laminate; attaching a first protective film unwound from a first protective film roll to the PVA-based film of the stretched film laminate; and separating the PVA-based film to which the first protective film has been attached from the base film.

After the base film and the PVA-based film are attached to each other, they may be re-wound on a roll, and then the film laminate may be subsequently unwound from the re-wound film laminate roll and be introduced to the stretching process, or may be introduced to the stretching process without the rewinding process.

In addition, the separation process may be performed by inserting a peeling device (for example, a peeling roll) between the base film and the PVA-based film, separating an interface between the base film and the PVA-based film, and winding the separated base film and the separated PVA-based film on different rolls.

In the case of manufacturing the polarizing plate using the roll-to-roll process, a long roll-type polarizing plate may be obtained.

The polarizing plate manufactured using the aforementioned method may include the PVA-based polarizer having a thickness of 10 μm or less, for example, 1 μm to 10 μm, 3 μm to 10 μm, or 1 μm to 5 μm; and the first protective film attached to one surface of the PVA-based polarizer. As necessary, the polarizing plate may further include the sticky layer and/or the second protective film attached to the other surface of the PVA-based polarizer opposing to one surface thereof to which the first protective film has been attached.

In addition, even with such a significantly reduced thickness, the polarizing plate may have a single transmittance of 40% to 45% and a degree of polarization of 99% or higher, preferably 99.5% or higher, more preferably 99.7% or higher, exhibiting significantly superior optical properties.

In addition, the polarizing plate according to the exemplary embodiment of the present disclosure may have significantly superior uniformity in the degree of polarization in the width direction. Specifically, a standard deviation in degrees of polarization measured at 10 equidistant points on the polarizing plate in the width direction may be 0.002% or less.

In addition, the polarizing plate according to the exemplary embodiment of the present disclosure may exhibit superior flatness, without the generation of curling. More specifically, the degree of flatness of the polarizing plate may be measured by placing the polarizing plate on a flat surface, measuring distances between four edges of the polarizing plate and a bottom surface thereof, and arithmetically averaging the measured values, and in a case in which the degree of flatness is 5 mm or less, it can be determined as significantly superior flatness.

Meanwhile, the polarizing plate according to the exemplary embodiment of the present disclosure may further include a functional optical layer, such as a luminance improving film, a primer layer, a hard coating layer, a glare proof layer, an anti-reflection layer, or the like, in addition to the first protective film, the second protective film and/or the sticky layer. Methods of forming such optical layers are not particularly limited, and may be methods commonly known in the art to which the present disclosure pertains.

Since the polarizing plate according to the exemplary embodiment of the present disclosure is relatively thin and has superior optical properties as compared with existing polarizing plates, it may be advantageously used in display devices such as liquid crystal display (LCD) panels, organic electroluminescence devices, and the like.

Mode for Disclosure

Inventive Example 1

A thin film polarizer manufacturing test was performed by forming a film laminate by attaching PVA films to both surfaces of a thermoplastic polyurethane base film of 60 μm using attractive force therebetween, and stretching the film laminate through wet stretching. Here, the PVA film was a PVA film of 30 μm (M3000 grade manufactured by Nippon Synthetic Chemical Industry Co., Ltd.). After the PVA films were subjected to a swelling process in a pure water solution at 25° C. for 15 seconds, they were dyed in a solution having an iodine concentration of 0.3 wt % at 25° C. for 60 seconds. Then, after the PVA films were subjected to a cleaning process in a solution having a boric acid concentration of 1 wt % at 25° C. for 15 seconds, they were stretched at a magnification of 7 times in a solution having a boric acid concentration of 2.5 wt % at 52° C. After the stretching process, the PVA films were subjected to a complementing process in a solution having a KI concentration of 5 wt %, and were then dried in an oven at 80° C. for 5 minutes. A thickness of the dried PVA film was 6 μm to 8 μm. After the drying process, triacetyl cellulose (TAC) films of 40 μm were positioned on one surfaces of respective PVA polarizers attached to both surfaces of the base film with a PVA-based water-soluble adhesive interposed therebetween, and they were bonded together using a laminator. The resultant film laminate was dried in an oven at 80° C. for 5 minutes.

Thereafter, respective PVA polarizers having the TAC film on one surfaces thereof were separated from both surfaces of the base film, thereby obtaining the PVA polarizers, each of which had the TAC film attached to one surface thereof. Then, TAC films of 40 μm were positioned on the other surfaces of respective PVA polarizers with a PVA-based water-soluble adhesive interposed therebetween, and they were bonded together using a laminator. The resultant film laminates were dried in an oven at 80° C. for 5 minutes. As a result, thin polarizing plates were manufactured, each of which had a TAC/PVA/TAC structure.

Comparative Example 1

After an aqueous PVA solution was prepared by dissolving a PVA film (M-grade manufactured by Nippon Synthetic Chemical Industry Co., Ltd., an average degree of polymerization: 2,400, an average degree of saponification: 99 mol %) in pure water at 100° C., the aqueous PVA solution was coated on a PET base film of 200 μm (NOVA-Clear SG007 grade manufactured by MGC Com.) using a lip coater, and was dried in an oven at 80° C. for 10 minutes to thereby form a film laminate. Here, a thickness of the PVA film was 10 μm. After the film laminate was subjected to a swelling process in a pure water solution at 25° C. for 15 seconds, the film laminate was dyed in an iodine solution having an iodine concentration of 0.3 wt % at 25° C. for 60 seconds. Thereafter, the film laminate was subjected to a cleaning process in a solution having a boric acid concentration of 1 wt % at 25° C. for 15 seconds, and was stretched at a magnification of 5.5 times in a solution having a boric acid concentration of 2.5 wt % at 52° C. After the stretching process, the film laminate was subjected to a complementing process in a solution having a KI concentration of 5 wt %, and was then dried in an oven at 80° C. for 5 minutes. However, the PVA coating layer was peeled off during the stretching process, resulting in a failure to manufacture a thin PVA film. FIG. 2 is a photograph illustrating a state of the film laminate manufactured according to Comparative Example 1.

Comparative Example 2

After an aqueous PVA solution was prepared by dissolving a PVA film (M-grade manufactured by Nippon Synthetic Chemical Industry Co., Ltd., an average degree of polymerization: 2,400, an average degree of saponification: 99 mol %) in pure water at 100° C., the aqueous PVA solution was coated on a PET base film of 200 μm (NOVA-Clear SG007 grade manufactured by MGC Com.) using a lip coater, and was dried in an oven at 80° C. for 10 minutes to thereby form a film laminate. Here, a thickness of the PVA film was 10 μm. After the film laminate was subjected to a swelling process in an aqueous solution having a boric acid concentration of 1.0 wt % at 25° C. for 15 seconds, the film laminate was dyed in an iodine solution having an iodine concentration of 0.3 wt % and a boric acid concentration of 3.0 wt % at 25° C. for 60 seconds. Thereafter, the film laminate was subjected to a cleaning process in a solution having a boric acid concentration of 1 wt % at 25° C. for 15 seconds, and was stretched at a magnification of 5.5 times in a solution having a boric acid concentration of 2.5 wt % at 60° C. After the stretching process, the film laminate was subjected to a complementing process in a solution having a KI concentration of 5 wt %, and was then dried in an oven at 100° C. for 8 minutes. A thickness of the dried PVA film was 4 μm to 4.5 μm. After the drying process, TAC films of 40 μm were positioned on one surfaces of respective PVA polarizers attached to both surfaces of the base film with a PVA-based water-soluble adhesive interposed therebetween, and they were bonded together using a laminator. The resultant film laminate was dried in an oven at 80° C. for 5 minutes. Thereafter, respective PVA polarizers having the TAC film on one surfaces thereof were separated from both surfaces of the base film, thereby obtaining the PVA polarizers, each of which had the TAC film attached to one surface thereof. Then, TAC films of 40 μm were positioned on the other surfaces of respective PVA polarizers with a PVA-based water-soluble adhesive interposed therebetween, and they were bonded together using a laminator. The resultant film laminates were dried in an oven at 80° C. for minutes. As a result, thin polarizing plates were manufactured, each of which had a TAC/PVA/TAC structure. The optical properties of the manufactured thin polarizing plates were measured using a JASCO V-7100 Spectrophotometer.

Comparative Example 3

A PVA film of 30 μm (M3000 grade manufactured by Nippon Synthetic Chemical Industry Co., Ltd.) used in the Inventive Example was solely stretched at a magnification of 6 times under the same stretching conditions as those of the Inventive Example, without using a base film, thereby forming a polarizing element of 13 μm. TAC films of 40 μm were positioned on both surfaces of the polarizing element with a PVA-based water-soluble adhesive interposed therebetween, and they were bonded together using a laminator. The resultant film laminate was dried in an oven at 80° C. for 5 minutes. As a result, a polarizing plate having a TAC/PVA/TAC structure was manufactured.

Comparative Example 4

A PVA film of 60 μm (M6000 grade manufactured by Nippon Synthetic Chemical Industry Co., Ltd.) used in the Inventive Example was solely stretched at a magnification of 6 times under the same stretching conditions as those of the Inventive Example, without using a base film, thereby forming a general polarizing element of 22 μm. TAC films of 40 μm were positioned on both surfaces of the polarizing element with a PVA-based water-soluble adhesive interposed therebetween, and they were bonded together using a laminator. The resultant film laminate was dried in an oven at 80° C. for 5 minutes. As a result, a polarizing plate having a TAC/PVA/TAC structure was manufactured.

Experimental Example 1—Optical Properties

Single transmittance (Ts), cross transmittance (Tc), degree of polarization (DOP), single color (a, b), and cross color (a, b) of the thin polarizing plates manufactured according to Inventive Example 1 and Comparative Example 2 were measured using a JASCO V-7100 Spectrophotometer.

TABLE 1

| | | | | Single Color | | Cross Color | |
| --- | --- | --- | --- | --- | --- | --- | --- |
| | Ts(%) | Tc(%) | DOP(%) | a | b | a | b |
| Inventive Example | 42.55 | 0.0647 | 99.8275 | −0.03 | 2.05 | 2.40 | −1.41 |
| Comparative Example 2 | 34.97 | 0.1259 | 99.4971 | −0.07 | 0.56 | 2.12 | −3.01 |

According to Table 1, although the Inventive Example had higher single transmittance (Ts) than that of Comparative Example 2, it exhibited the degree of polarization (DOP) higher than that of Comparative Example 2. Therefore, it can be seen that the Inventive Example had superior optical performance to that of Comparative Example 2.

Meanwhile, in the case of manufacturing a thin film polarizer using a coating method under the same manufacturing process conditions as those of the Inventive Example as in Comparative Example 1, the coated PVA film was peeled off as illustrated in Comparative Example 2, resulting in a failure to manufacture a thin film polarizer. In the case of Comparative Example 2 in which a boric acid was added in the swelling and dyeing processes and a stretching temperature was increased, a PVA film could be manufactured using the coating method, but it suffered deterioration in transmittance. Thus, a polarizer having a degree of polarization of 99.0% or higher while having a transmittance of 40% to 45%, suggested in the exemplary embodiment of the present disclosure could not be manufactured.

Experimental Example 2—Curling Properties

Curling properties of the polarizing plates manufactured according to the Inventive Example and Comparative Examples 3 and 4 were observed with the naked eye. Photographs of the corresponding polarizing plates are illustrated in FIG. 3. With reference to FIG. 3, it can be seen that the polarizing plate manufactured according to the Inventive Example had a lower degree of curling as compared with the polarizing plates manufactured according to Comparative Examples 3 and 4.

Experimental Example 3—Evaluating Uniformity in Degree of Polarization

With respect to the polarizers manufactured according to Inventive Example 1 and Comparative Example 2, the degrees of polarization were measured at 10 equidistant points on each polarizer in the width direction, and then a standard deviation in the measured degrees of polarization was calculated. The degrees of polarization were measured using a JASCO V-7100 Spectrophotometer. The measurement results are shown in Table 2.

TABLE 2

| Position | Degree of Polarization (%) | |
| --- | --- | --- |
| | Inventive Example 1 | Comparative Example 2 |
| 1 | 99.8284 | 99.5641 |
| 2 | 99.8263 | 99.4421 |
| 3 | 99.8255 | 99.4336 |
| 4 | 99.8279 | 99.4832 |
| 5 | 99.8293 | 99.6104 |
| 6 | 99.8291 | 99.5826 |
| 7 | 99.8281 | 99.4859 |
| 8 | 99.8272 | 99.4091 |
| 9 | 99.8256 | 99.4426 |
| 10 | 99.8271 | 99.5173 |
| Average | 99.8275 | 99.4971 |
| Standard Deviation | 0.0014 | 0.0692 |

Inventive Example 2

PVA containing an acetoacetyl group of 5 wt % (manufactured by Nippon Synthetic Chemical Industry Co., Ltd., an average degree of polymerization: 2,000, an average degree of saponification: 94 mol %) was dissolved in pure water, thereby preparing an aqueous PVA solution of 4 wt %. While a titanium amine complex crosslinking agent (Commercial Product Name: TYZOR TE, manufactured by DuPont) was added to the aqueous PVA solution at a ratio of 6.7 parts by weight with respect to 100 parts by weight of PVA, they were stirred and mixed together to thereby prepare an adhesive A.

After the adhesive A was applied to both surfaces of a thermoplastic polyurethane base film of 40 μm and PVA films of 20 μm (M2000 grade manufactured by Nippon Synthetic Chemical Industry Co., Ltd.) were stacked thereon, they were allowed to pass through a laminator to thereby form a film laminate. After the film laminate was subjected to a swelling process in a pure water solution at 25° C. for seconds, it was dyed in a solution having an iodine concentration of 0.3 wt % at 25° C. for 60 seconds. Thereafter, the film laminate was subjected to a cleaning process in a solution having a boric acid concentration of 1 wt % at 25° C. for 15 seconds, and was stretched at a magnification of 7 times in a solution having a boric acid concentration of 2.5 wt % at 52° C. After the stretching process, the film laminate was subjected to a complementing process in a solution having a KI concentration of 5 wt %, and was then dried in an oven at 80° C. for 5 minutes. A thickness of the dried PVA film was 7.5 μm. After the drying process, TAC films of 40 μm were positioned on one surfaces of respective PVA polarizers attached to both surfaces of the base film with a PVA-based water-soluble adhesive interposed therebetween, and they were bonded together using a laminator. The resultant film laminate was dried in an oven at 80° C. for 5 minutes. Thereafter, respective PVA polarizers having the TAC film on one surfaces thereof were separated from both surfaces of the base film with a peel strength of 0.7N/2 cm, thereby obtaining the PVA polarizers, each of which had the TAC film attached to one surface thereof. Then, TAC films of 40 μm were positioned on the other surfaces of respective PVA polarizers with a PVA-based water-soluble adhesive interposed therebetween, and they were bonded together using a laminator. The resultant film laminates were dried in an oven at 80° C. for minutes. As a result, thin polarizing plates were manufactured, each of which had a TAC/PVA/TAC structure.

Comparative Example 5

After a commercially available PVA-based adhesive having a solid content of 4 wt % (Commercial Product Name: JC25, manufactured by JAPAN VAM & POVAL Co., Ltd.) was applied to both surfaces of a thermoplastic polyurethane base film of 40 μm and PVA films of 20 μm (M2000 grade manufactured by Nippon Synthetic Chemical Industry Co., Ltd.) were stacked thereon, they were allowed to pass through a laminator to thereby form a film laminate. The film laminate was subjected to a swelling process in a pure water solution at 25° C. for 15 seconds, and was dyed in a solution having an iodine concentration of 0.3 wt % at 25° C. for 60 seconds. Thereafter, the film laminate was subjected to a cleaning process in a solution having a boric acid concentration of 1 wt % at 25° C. for 15 seconds, and was stretched at a magnification of 7 times in a solution having a boric acid concentration of 2.5 wt % at 52° C. However, breakage of the film laminate occurred during the stretching process.

Comparative Example 6

After a commercially available PVA-based adhesive having a solid content of 4 wt % (Commercially Product Name:

JC25, manufactured by JAPAN VAM & POVAL Co., Ltd.) was applied to both surfaces of a thermoplastic polyurethane base film of 40 μm and PVA films of 20 μm (M2000 grade manufactured by Nippon Synthetic Chemical Industry Co., Ltd.) were stacked thereon, they were allowed to pass through a laminator to thereby form a film laminate. The film laminate was subjected to a swelling process in a pure water solution at 25° C. for 15 seconds, and was dyed in a solution having an iodine concentration of 0.3 wt % at 25° C. for 60 seconds. Thereafter, the film laminate was subjected to a cleaning process in a solution having a boric acid concentration of 1 wt % at 25° C. for 15 seconds, and was stretched at a magnification of 6 times in a solution having a boric acid concentration of 2.5 wt % at 52° C. Then, the film laminate was subjected to a complementing process in a solution having a KI concentration of 5 wt %, and was then dried in an oven at 80° C. for 5 minutes.

In this case, the breakage of the film laminate did not occur during the stretching and cleaning processes, but sides of the stretched film laminate were curled. FIG. 4 is a photograph illustrating a state of the film laminate according to Comparative Example 6 after stretching. Meanwhile, FIG. 5 is a photograph illustrating a state of the film laminate according to Inventive Example 2 after stretching. As illustrated in FIGS. 4 and 5, the sides of the film laminate according to Comparative Example 6 were curled after stretching, while such a phenomenon did not occur in the film laminate according to Inventive Example 2.

DESCRIPTION OF REFERENCE CHARACTERS

H: Holder
A: Polyvinyl Alcohol-based Film
B: base Film
MD: Longitudinal Orientation Direction

The invention claimed is:

1. A method of manufacturing a thin polarizing plate, the method comprising:
  providing a prefabricated non-stretched polyvinyl alcohol (PVA)-based film;
  providing a non-stretched base film;
  forming a film laminate by attaching the prefabricated non-stretched polyvinyl alcohol (PVA)-based film to the non-stretched base film, using an adhesive;
  stretching the film laminate;
  attaching a first protective film to the PVA-based film of the stretched film laminate; and
  separating the PVA-based film having the first protective film attached thereto from the base film,
  wherein the stretching of the film laminate is performed through wet stretching at a magnification of 6 to 15 times at a temperature of 20° C. to 85° C.,
  wherein the adhesive strength between the stretched PVA-based film and the stretched base film after the stretching of the film laminate is 0.1N/2 cm to 2N/2 cm,
  wherein the base film is a thermoplastic polyurethane,
  wherein the adhesive includes 100 parts by weight of a PVA-based resin having an acetoacetyl group and 1 to 50 parts by weight of an amine-based metal compound crosslinking agent, and
  wherein a thickness of the adhesive layer formed of the aforementioned adhesive is 80 nm to 200 nm, prior to the stretching of the film laminate, and 10 nm to 100 nm, after the stretching of the film laminate.

2. The method of claim 1, wherein the non-stretched PVA-based film has a thickness of 10 μm to 60 μm.

3. The method of claim 1, wherein the stretching of the film laminate is performed in an aqueous boric acid solution having a boric acid concentration of 1% to 5%.

4. The method of claim 1, wherein the stretching of the film laminate is performed to allow the PVA-based film to have a thickness of 10 μm or less.

5. The method of claim 1, further comprising dyeing the film laminate with at least one of iodine and a dichroic dye, prior to the stretching of the film laminate.

6. The method of claim 1, further comprising drying the stretched film laminate, after the stretching of the film laminate.

7. The method of claim 1, further comprising attaching a second protective film to a surface of the PVA-based film having no protective film, after the separating of the PVA based film having the first protective film attached thereto from the base film.

8. The method of claim 1, further comprising forming a sticky layer on a surface of the PVA-based film having no protective film, after the separating of the PVA-based film having the first protective film attached thereto from the base film.

9. The method of claim 1, wherein the base film has a maximum stretching magnification of 5 times or more at a temperature of 20° C. to 85° C.

10. The method of claim 1, wherein the first protective film includes at least one selected from the group consisting of a polyester-based polymer, a styrene-based polymer, a cellulose-based polymer, a polyethersulfone-based polymer, a polycarbonate-based polymer, an acrylic-based polymer, a polyolefin-based polymer, a polyamide-based polymer, a polyimide-based polymer, a sulfone-based polymer, a poly ether sulfone-based polymer, a polyether ether ketone-based polymer, a polyphenylene sulfide-based polymer, a vinyl alcohol-based polymer, a vinylidene chloride polymer, a vinyl butyral-based polymer, an arylate-based polymer, a polyoxymethylene-based polymer, an epoxy-based polymer, and mixtures thereof.

11. The method of claim 7, wherein the second protective film includes at least one selected from the group consisting of a polyester-based polymer, a styrene-based polymer, a cellulose-based polymer, a polyethersulfone based polymer, a polycarbonate-based polymer, an acrylic based polymer, a polyolefin-based polymer, a polyamide based polymer, a polyimide-based polymer, a sulfone-based polymer, a poly ether sulfone-based polymer, a polyether ether ketone-based polymer, a polyphenylene sulfide-based polymer, a vinyl alcohol-based polymer, a vinylidene chloride polymer, a vinyl butyral-based polymer, an arylate-based polymer, a polyoxymethylene-based polymer, an epoxy-based polymer, and mixtures thereof.

* * * * *